(12) United States Patent
Kilian et al.

(10) Patent No.: US 9,435,137 B2
(45) Date of Patent: Sep. 6, 2016

(54) DEVICE FOR SECURING AN ESSENTIAL COMPONENT OF A MOTOR VEHICLE HANDLE

(75) Inventors: Marion Kilian, Velbert (DE); Sebastian Gebel, Cologne (DE); Anuj Kaushal, Essen (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 391 days.

(21) Appl. No.: 13/880,313

(22) PCT Filed: Sep. 30, 2011

(86) PCT No.: PCT/EP2011/067105
§ 371 (c)(1),
(2), (4) Date: Apr. 18, 2013

(87) PCT Pub. No.: WO2012/052274
PCT Pub. Date: Apr. 26, 2012

(65) Prior Publication Data
US 2013/0199254 A1    Aug. 8, 2013

(30) Foreign Application Priority Data

Oct. 18, 2010  (DE) .......... 10 2010 038 255
Jan. 19, 2011  (DE) .......... 10 2011 000 224

(51) Int. Cl.
*E05B 9/08*    (2006.01)
*B60R 25/06*   (2006.01)
(Continued)

(52) U.S. Cl.
CPC ............... *E05B 9/08* (2013.01); *B60R 25/066* (2013.01); *E05B 79/06* (2013.01); *E05B 9/084* (2013.01); *E05B 63/04* (2013.01); *Y10T 70/8541* (2015.04)

(58) Field of Classification Search
CPC .......... Y10T 70/7655; Y10T 70/8541; Y10T 70/5761; Y10T 70/7661; Y10T 70/7644; Y10T 70/8973; Y10T 70/5832; Y10S 292/31; B60R 25/066; E05B 79/06; E05B 63/04; E05B 9/084; E05B 9/08
USPC ................... 70/370–373, 224, 451, 452, 466
See application file for complete search history.

(56) References Cited

U.S. PATENT DOCUMENTS 1,797,725 A * 3/1931 Jacobi ............................. 70/368
1,941,555 A * 1/1934 Jacobi ............................. 70/368
(Continued)

FOREIGN PATENT DOCUMENTS

CN    1542248 A    11/2004
EP    1026351 A1   8/2000
(Continued)

OTHER PUBLICATIONS

International Search Report for corresponding International Application No. PCT/EP2011/067105 mailed Mar. 15, 2012.
(Continued)

*Primary Examiner* — Suzanne Barrett
(74) *Attorney, Agent, or Firm* — Calfee Halter & Griswold LLP

(57) ABSTRACT

Provided is a device for securing an essential component, in particular a lock cylinder, a lock cylinder catch or the like, of a handle of a motor vehicle, the device having a carrier, which can be secured on the inside to a movable part, in particular to a lid, tailgate or door. A blocking unit is arranged on the carrier and comprises movable gear elements, by means of which the blocking unit can be moved between a blocking position and a release position, the component being located in a detached manner in the carrier in the release position and the component being held securely on the carrier in the blocking position.

24 Claims, 8 Drawing Sheets

Figure 1:
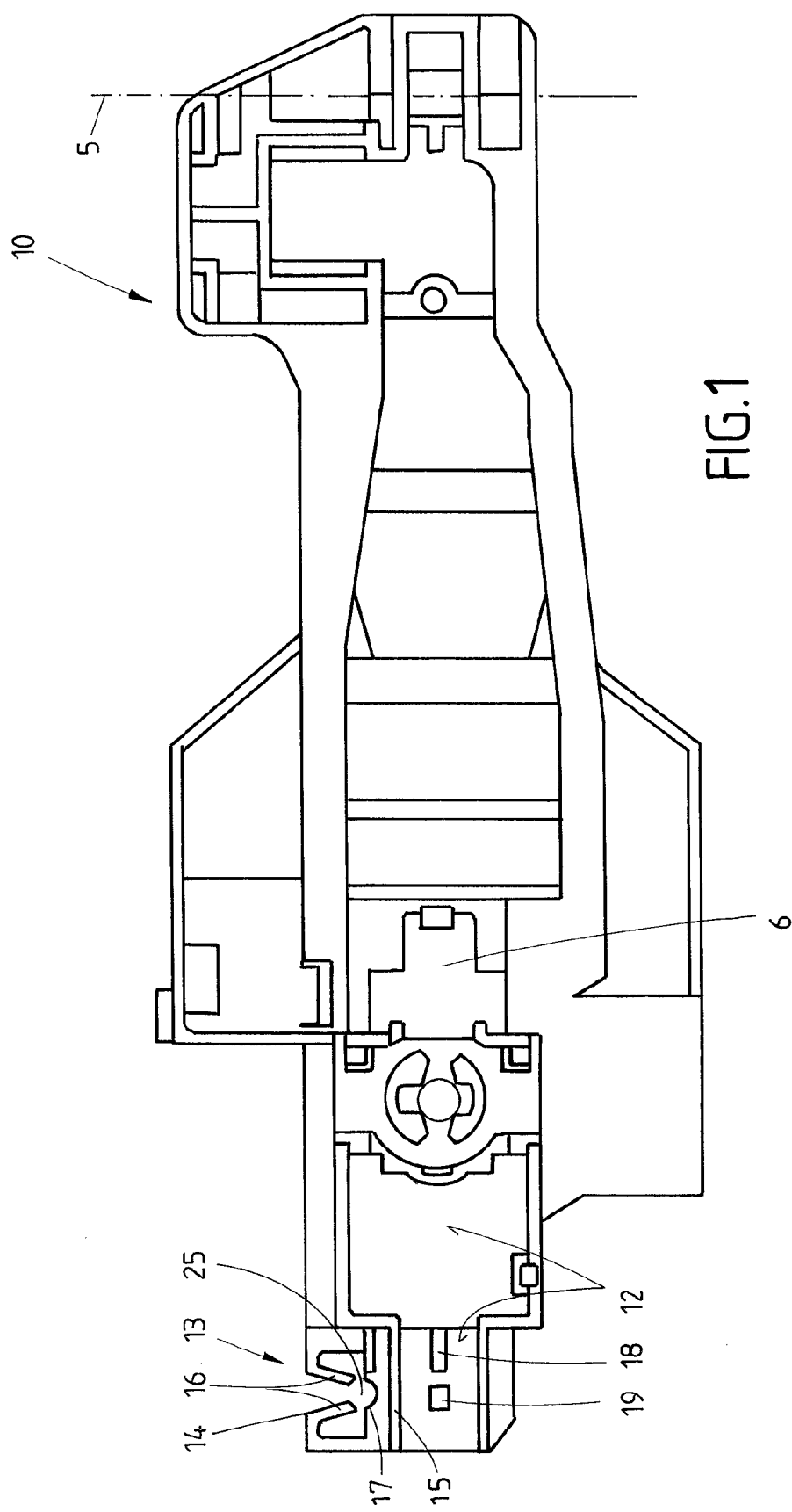

(51) Int. Cl.
*E05B 79/06* (2014.01)
*E05B 63/04* (2006.01)

(56) References Cited

U.S. PATENT DOCUMENTS

| | | | | |
|---|---|---|---|---|
| 2,040,258 | A | * | 5/1936 | Jacobi ............................. 70/370 |
| 2,244,976 | A | * | 6/1941 | Tinnerman .................... 411/173 |
| 2,717,512 | A | * | 9/1955 | Sterling et al. ................. 70/100 |
| 3,297,916 | A | * | 1/1967 | Wright .......................... 361/710 |
| 3,589,152 | A | * | 6/1971 | Glass et al. ...................... 70/81 |
| 3,824,817 | A | * | 7/1974 | Orr .................................. 70/81 |
| 4,756,638 | A | * | 7/1988 | Neyret .......................... 403/261 |
| 5,551,268 | A | * | 9/1996 | Carnes et al. .................. 70/370 |
| 6,079,241 | A | * | 6/2000 | Burleigh et al. ............... 70/370 |
| 6,550,295 | B2 | * | 4/2003 | Hubner .......................... 70/208 |
| 6,901,638 | B2 | * | 6/2005 | Itou et al. ....................... 24/570 |
| 8,104,314 | B2 | * | 1/2012 | Mueller et al. ................. 70/370 |
| 8,739,584 | B2 | * | 6/2014 | Kargilis et al. ................. 70/208 |
| 2012/0304542 | A1 | * | 12/2012 | Kargilis et al. ................. 49/460 |

FOREIGN PATENT DOCUMENTS

| | | |
|---|---|---|
| EP | 1176271 A1 | 1/2002 |
| EP | 1416108 A1 | 5/2004 |
| EP | 1473423 A2 | 11/2004 |
| EP | 102004007083 | 9/2005 |
| EP | 1632627 A1 | 3/2006 |
| WO | WO 2012045589 A1 * | 4/2012 |

OTHER PUBLICATIONS

Office Action from Chinese Application No. 2011800503787 dated Sep. 30, 2014.

* cited by examiner

DEVICE FOR SECURING AN ESSENTIAL COMPONENT OF A MOTOR VEHICLE HANDLE

This application is a national phase if International Application No. PCT/EP2011/067105 filed Sep. 30, 2011 and published in the German language. This application claims the benefit of German Application No. 10 2010 038 255.8 filed Oct. 18, 2010, and German Application No. 10 2011 000 224.2 filed Jan. 19, 2011, which are hereby incorporated herein by reference.

The invention relates to a device for attaching an essential component, specifically a lock cylinder, a lock cylinder dummy etc. of a handle of a motor vehicle, with a carrier which can be attached on the inside on a movable part, specifically a lid, a tailgate, or a door.

DE 10 2007 027 848 describes a handle of a motor vehicle that comprises a carrier that can be attached on the inside of a door. The carrier has different functions; for example, the grip element provided for the user that is positioned on the outside of the door may be movably supported in a suitable place on the carrier. In addition, the carrier offers a suitable attachment area for the lock cylinder that must be fixed on the carrier by the assembly person when the handle is installed. In different application situations, specifically this process of fixing the lock cylinder can be difficult. Since standardized handles are frequently used in different models of motor vehicles, attaching essential components like a lock cylinder on the handle reliably and with little assembly effort is of great interest.

This invention addresses the problem of proposing a device for attaching an essential component where the assembly effort for the actual fixing of the component can be kept low.

In order to solve this problem, a device with the characteristics of claim 1 is proposed. Preferred embodiments are given in the dependent claims.

According to the invention, a blocking unit is arranged on the carrier that comprises movable gear elements with which the blocking unit can be moved between a blocking position and a release position, with the component being located loosely, in particular unsecured, on the carrier in the release position, and the component being held reliably on the carrier in the blocking position.

By using movable gear elements, the component can be fixed on the carrier in a simple manner during the assembly. Here, the blocking unit offers a blocking position and a release position, wherein, in the release position, the component can first be inserted on the carrier and can be placed in the desired position before the actual fixing on the carrier takes place. In the second step, the blocking unit is switched from its release position to the blocking position in which the component assumes its final attachment position. The blocking unit offers the assembly person a standardized attachment process during which the gear elements are to be moved as needed to put the blocking unit in its blocking position.

In a preferred embodiment of the invention, at least one gear element may be accessible from the outside in order to effect the attachment of the component. This means that during the assembly a tool can be inserted from the outside to the blocking unit in order to impart an appropriate motion on at least one gear element whereby an appropriate fixation of the component on the carrier can be effected.

Advantageously, access to at least one gear element can be provided from the inside of the movable part. The device according to the invention is especially well suited for making it possible during the assembly to move, by means of a tool, one of the gear elements from the inside of the movable part, specifically the door of the motor vehicle, in order to effect the transition of the blocking unit from the release position to the blocking position. After an appropriate fixation of the component on the carrier has been achieved, the interior trim of the door of the motor vehicle can be installed so that the interior trim reliably covers the inside access to the gear element of the blocking unit.

In a preferred embodiment of the invention, an outside grip element may be arranged on the carrier. The grip element may consist of a turning handle, a pull handle, a folding handle, or a pistol grip handle. Advantageously, the outside grip element is supported movably on the carrier, with the grip element and the carrier extending in elongated configuration. In a possible embodiment of the invention, the elongated extension may extend horizontally on the movable part, specifically on the door. Horizontal here means that the grip element as well as the carrier are aligned along the longitudinal extension of the motor vehicle.

In another embodiment of the invention, the extension may extend vertically on the movable part, specifically on the door of the motor vehicle, which means that the handle element as well as the carrier are aligned vertically in relation to the surface on which the motor vehicle stands.

In another embodiment of the device according to the invention, the blocking unit is located within a handle that is attached to a sliding door of a motor vehicle. It proved to be an advantage that, with sliding doors, the inside access to the blocking unit is of special advantage during the assembly, especially when the grip element and the carrier extend vertically.

Provisions may also be made for the blocking unit to comprise a safety device that, when activated, ensures the retention of the blocking position. With the safety device in deactivated condition, the blocking unit may still assume its blocking position, but the blocking position of the blocking unit will then not be reliably ensured.

In a particular embodiment of the device according to the invention, the safety device may be accessible from the outside so that the assembly person may put the safety device in its activated condition from the outside.

Advantageously, access to the safety device is provided from the inside of the movable part, specifically the door of the motor vehicle, which means that the blocking unit as well as the safety device can be operated from the same inside. This makes it possible to significantly reduce the assembly effort.

In addition, provisions may be made for the arrangement of the gear elements as a single-stage gear with a drive element and an output element. Use of the single-stage gear represents simple kinematics that promote a reliable movement of the individual gear elements so that the blocking unit can be moved between a blocking position and a release position. Also, the single-stage gear represents a compact overall arrangement for putting the blocking unit in the appropriate position.

In a possible embodiment of the single-stage gear, the drive element may be configured as a drive wheel and/or the output element as a gear rack, at least in sections. In order to effect a reliable power transfer from the drive element to the output element, it may be of advantage for the drive element and the output element to mesh. In a particular embodiment, it may be of advantage that the meshing is of a self-locking nature, which means that it is not possible to move the blocking unit from its blocking position to the release position by means of a movement of the output element.

In a possible embodiment of the blocking unit, the drive wheel is supported around an axis of rotation on the carrier, with the output element being supported on the carrier with the ability to move linearly. An appropriate movement of the drive wheel around its axis of rotation causes a linear movement of the output element so that in an appropriate position of the output element the blocking unit reaches its blocking position, thereby reliably fixing the essential component within the carrier.

In a further embodiment, the blocking unit may comprise a movable attachment area that is detached from the component in the release position and reliably engages the component in the blocking position. The movable attachment area can be made in one piece and/or materially uniform with the gear-rack-like section of the output element. Advantageously, the output element forms a monolithic component with the gear-rack-like section and/or the attachment area. This means that the movement of the gear-rack-like section of the output element simultaneously moves the attachment area in the direction of the essential component, specifically the lock cylinder, when the blocking unit is moved from the release position in the direction of the blocking position. Once the blocking position is reached, the attachment area of the output element reliably engages the essential component, thereby ensuring a reliable fixing on the carrier.

Advantageously, the attachment area may be C-shaped, with the attachment area embracing at least in sections the component in the blocking position. As a rule, the lock cylinder has a cylinder-type extension that can be attached very well on the carrier via a C-shaped attachment area. Advantageously, the component to be fixed has a matching contour on the circumferential surface which can be engaged by the attachment area, specifically the C-shaped attachment area, thereby enabling the reliable fixing of the component to be attached.

In order to enable the easy movement of the blocking unit between the blocking position and the release position, the carrier can be designed with defined guide surfaces that make a movement of the attachment area and/or of the output element possible. The guide surfaces on the carrier favor an appropriate movement of the gear elements used herein.

According to the invention, the carrier may be designed with a receptacle for the drive element, with the drive element held on the receptacle by means of a latch connection and/or with the drive element supported in the receptacle with spring action. The receptacle on the carrier is designed so that the drive element can be mounted on the carrier in a simple way. The latch connection has the effect that the drive element remains reliably in its position within the receptacle even during the movement of the gear elements. At the same time, the drive element is able to rotate around its axis of rotation in order to move the output element as required. The spring-type support of the drive element that favors the ease of the movement of the gear elements can be achieved by means of bars with spring action, for example, that are part of the receptacle. For example, the bars may extend from outside of the receptacle in the direction of the axis of rotation of the drive element. Advantageously, several bars with spring action are provided in the receptacle. When inserting the drive element into the receptacle, provisions may be made for the bars with spring action to deform elastically and for them to return to their original position when the drive element has been inserted appropriately in the receptacle. Preferably, the carrier forms a monolithic component with the receptacle, consisting of an injection molded plastic part, for example.

As a measure for improving the invention, the receptacle may comprise a first opening through which the drive element can be placed in the receptacle, and/or a second opening through which the output element extends in the direction of the output element. Here, it is also possible for the bars with spring action to define the first opening, at least in sections. Advantageously, four bars with spring action are provided on the receptacle. Preferably, the drive element comprises a hub that can be moved around the axis of rotation of the drive element. Advantageously, the carrier may comprise an appropriate support location within the receptacle on which the hub sits movably. In addition, with their free ends, the bars contact the hub so that the drive element is held reliably in the receptacle without there being a danger of the drive element falling out of the first opening unintentionally.

Advantageously, the second opening is located on the side of the receptacle that is opposite the first opening through which it protrudes at least in sections and engages the output element. The overall design of the receptacle forms a type of cage for the drive element that is held reliably within the receptacle and simultaneously forms interfaces towards the outside in order to be driven by a tool, for example, as well as for moving the output element as required.

The receptacle as well as the blocking unit are of space-saving design in that, on the one hand, the gear elements have a flat configuration while, on the other hand, the geometry of the receptacle is matched to the design of the drive element, with specifically the first and/or the second opening of the receptacle having a slot-like design. In a possible embodiment of the invention, the drive element is of a disk-like design.

It is possible to provide a safety device at the gear-rack-like section of the output element that is operatively connected with the drive element. Alternatively, or in addition, provisions may be made for a safety element of the safety device to extend through the gear-rack-like section of the output element in the blocking position and to simultaneously intrude into the guide surface. The safety element is accessible from the outside so that, by means of a tool, the safety element can be fixed reliably on the guide surface, with the output element being simultaneously secured in the blocking position by the safety element. The safety element may consist of a screw.

In order to make a satisfactory movement of the output element along the guide surface of the carrier possible, the guide surface may comprise a guide element that engages a counter-guide element of the output element. For example, the guide element of the carrier may protrude from the guide surface and engage an associated opening that is formed by the counter-guide element. This ensures that the output element is able to move reliably back and forth within the guide surface without leaving the defined travel path within the guide surface of the carrier. Of course, it is also possible to engineer the output element with a protrusion-like counter-guide element that engages an associated recess of the guide surface.

In order to simplify the assembly for the assembly person, it is expedient to provide an assembly window that permits manipulations with a tool on the drive element as well as on the safety device. Advantageously, the drive element as well as the safety device and/or the assembly window are color coded in order to further reduce possible assembly errors.

Expediently, the safety device and/or the drive element may comprise a contour for accepting a force so that a tool can act on the safety device and/or on the drive element.

In a possible embodiment of the invention, the safety device may consist of a spring element that forms a monolithic component with the carrier and/or is connected in a materially uniform manner with the carrier, with the spring element being formed with a first latching element that reliably holds the blocking unit in the blocking position, specifically with the first latching element holding the gear-rack-like section of the output element in the blocking position of the blocking unit. While the blocking unit is moved in the direction of the blocking position, the latching element of the spring element is in contact with the moving blocking unit, with the spring element being under tension and elastically deformed and exerting a certain force in the direction of the blocking unit. When the blocking unit reaches the blocking position, the spring element snaps in the direction of the blocking unit, with the first latching element that is arranged on the spring element simultaneously preventing the blocking unit from moving out of the blocking position back into the release position unintentionally.

Preferably, the carrier may comprise a second and/or third latching element, with the second and/or third latching element in the area of the guide surfaces reliably holding the blocking unit in the blocking position and/or in the release position. The second and/or third latching element may also be engineered with spring action. It is also possible for the second and/or third latching element to engage the blocking unit only in the blocking position or only in the release position, or in the blocking position as well as in the release position, thereby fixing the blocking unit appropriately. Preferably, the second and/or third latching element forms a monolithic component with the carrier.

In a further measure for improving the invention, provisions may be made for the blocking unit to comprise a receptacle that is engaged by the first latching element when the blocking unit is in the release position, with the spring element being specifically not under tension. In a pre-assembled condition of the device according to the invention, the first latching element of the spring element is located in the receptacle of the blocking unit, with the spring element being simultaneously in an untensioned condition and/or in an elastically non-deformed condition. Simultaneously, the blocking unit is fixed in the release position by the latching element of the spring element in such a way that a movement of the blocking unit into the blocking position is impossible. This has the advantage that the spring element remains not under tension until the actual assembly process, and is thereby not subjected to material stresses.

In a possible embodiment of the invention, the first latching element is able to secure the blocking unit against shifting in the direction of the release position, and/or the second and/or third latching element are able to secure the blocking unit against unintentionally falling out approximately perpendicularly to the direction of movement while being between the blocking position and the release position.

Provisions may also be made for aligning the assembly window perpendicularly and/or diagonally in relation of the direction of movement of the blocking unit. Here, the assembly window is designed so that the assembly person can engage the drive element as well as the safety device with a suitable tool. Expediently, the assembly window has an elongated or slot-like shape and serves as an opening for both functional parts, i.e. for the drive element and for the spring-action safety device. If the assembly person wants to move the blocking unit that is already in its blocking position back to its release position, it is possible to easily reach the spring-action safety device with a suitable tool and to terminate the activated condition of the safety device. By a simultaneous turning operation on the drive element by means of an additional tool, the assembly person can initiate a movement of the blocking unit from the blocking position back into the release position.

In another embodiment of the invention, the gear-rack-type section may be bar-shaped or C-shaped, with the C-shaped section comprising two gears arranged at a distance from each other, and with the drive element supported rotatably on the carrier between the gears. This embodiment requires less assembly volume, which is a significant advantage. The receptacle for the drive element is located between the gears of the blocking unit that are arranged at a distance from each other, with the drive element being advantageously in operative connection with only one of the gears. The device according to the invention can be used for motor vehicle doors on the left or on the right side of the motor vehicle, where, for transitioning the blocking unit from the release position to the blocking position, the assembly person needs to turn the drive element in only one direction (clockwise or counterclockwise) for both vehicle doors. For the opposite door of the vehicle it is only necessary to shift the axis of rotation of the drive element to the opposite gear in order to produce there an operative connection with the gear of the drive element. At the same time, a defined distance exists to the second gear of the gear-rack-type section with the drive element.

Advantageously, the carrier may comprise holding elements that hold the drive element securely between the gears, with the holding elements specifically engineered as latching hooks with spring action. The holding elements are designed so that the drive element can be rotated by the assembly person by means of a tool in order to impart a translational movement on the blocking unit. At the same time, the holding elements are designed in such a way that a reliable attachment of the drive element in its receptacle on the carrier is achieved.

Additional advantages, characteristics, and details of the invention are given in the following description where embodiments of the invention are described in detail with reference to the drawings. The characteristics referred to in the claims and in the description can be essential for the invention either individually by themselves or in any combination thereof.

Figure 2:
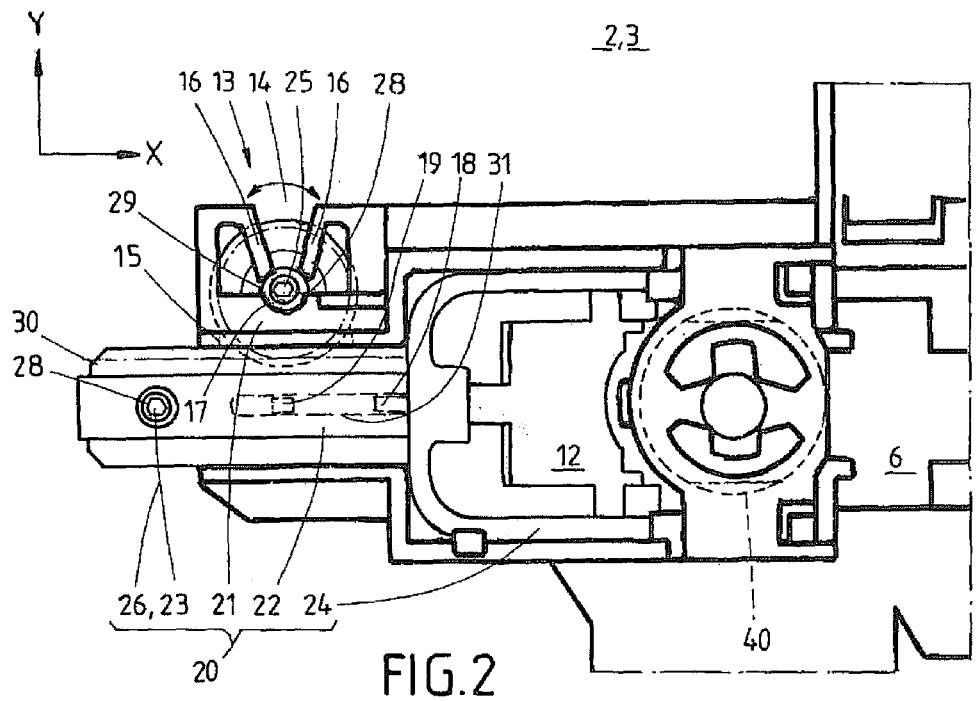
Figure 3:
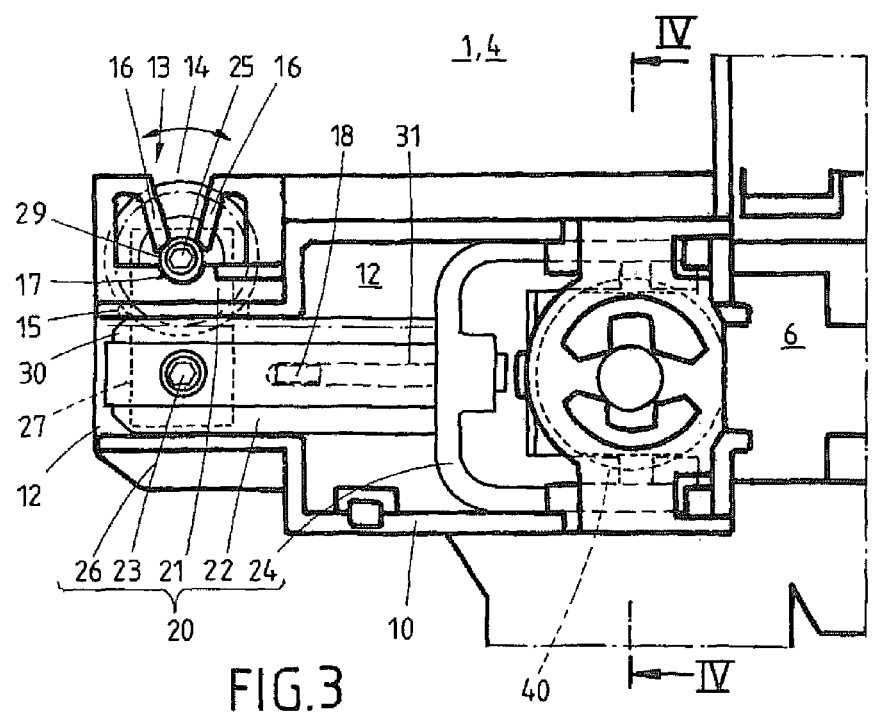
Figure 4:
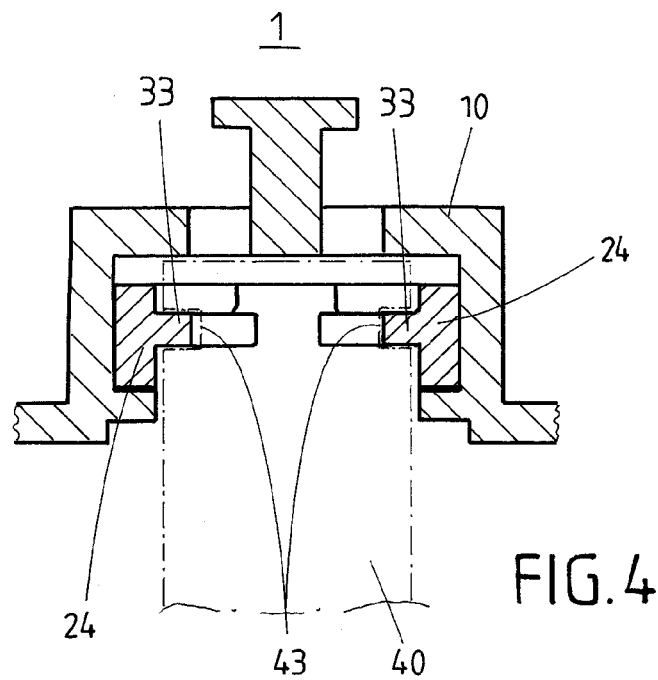
Figure 5:
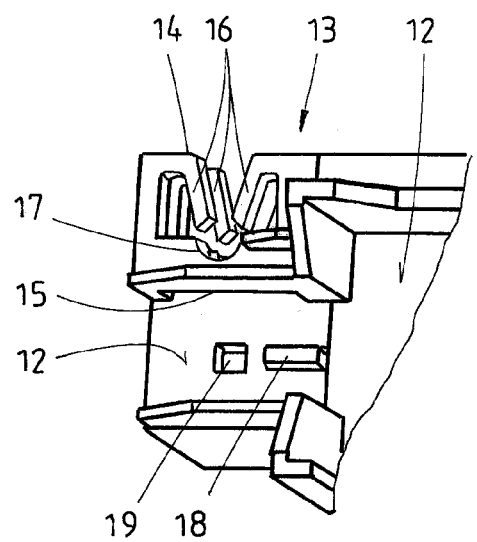
Figure 6:
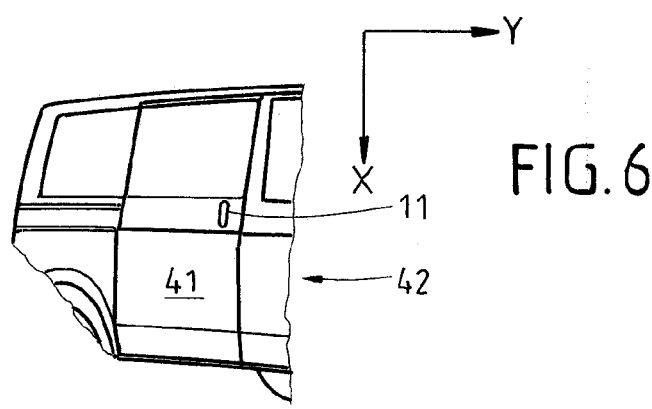
Figure 7:
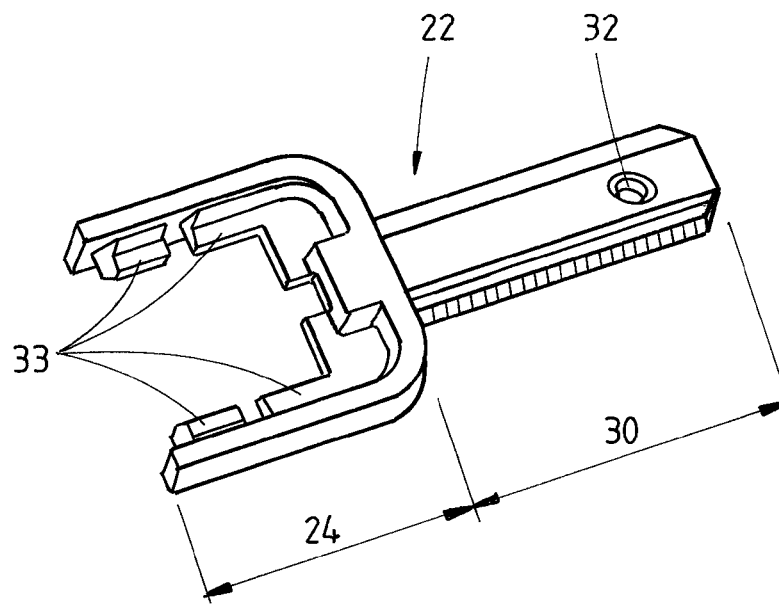
Figure 8:
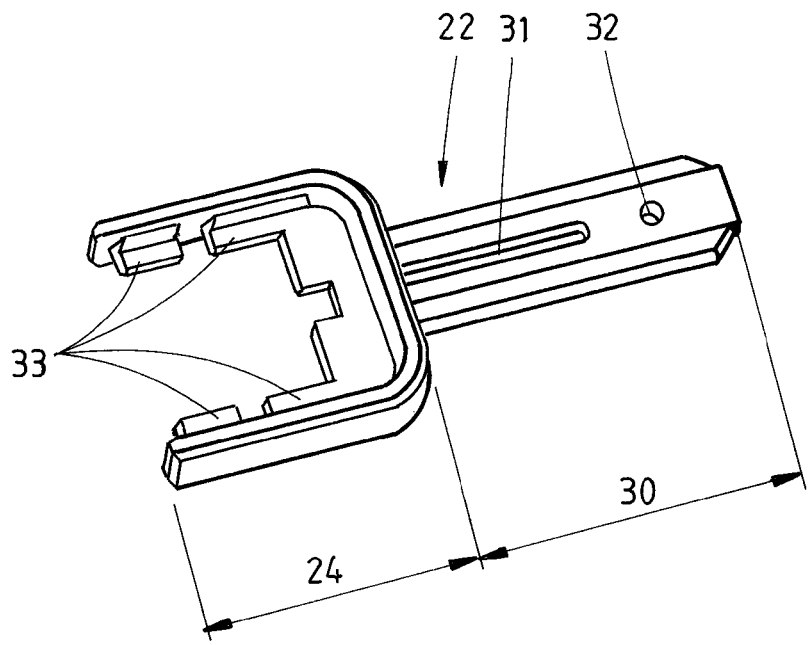
Figure 9:
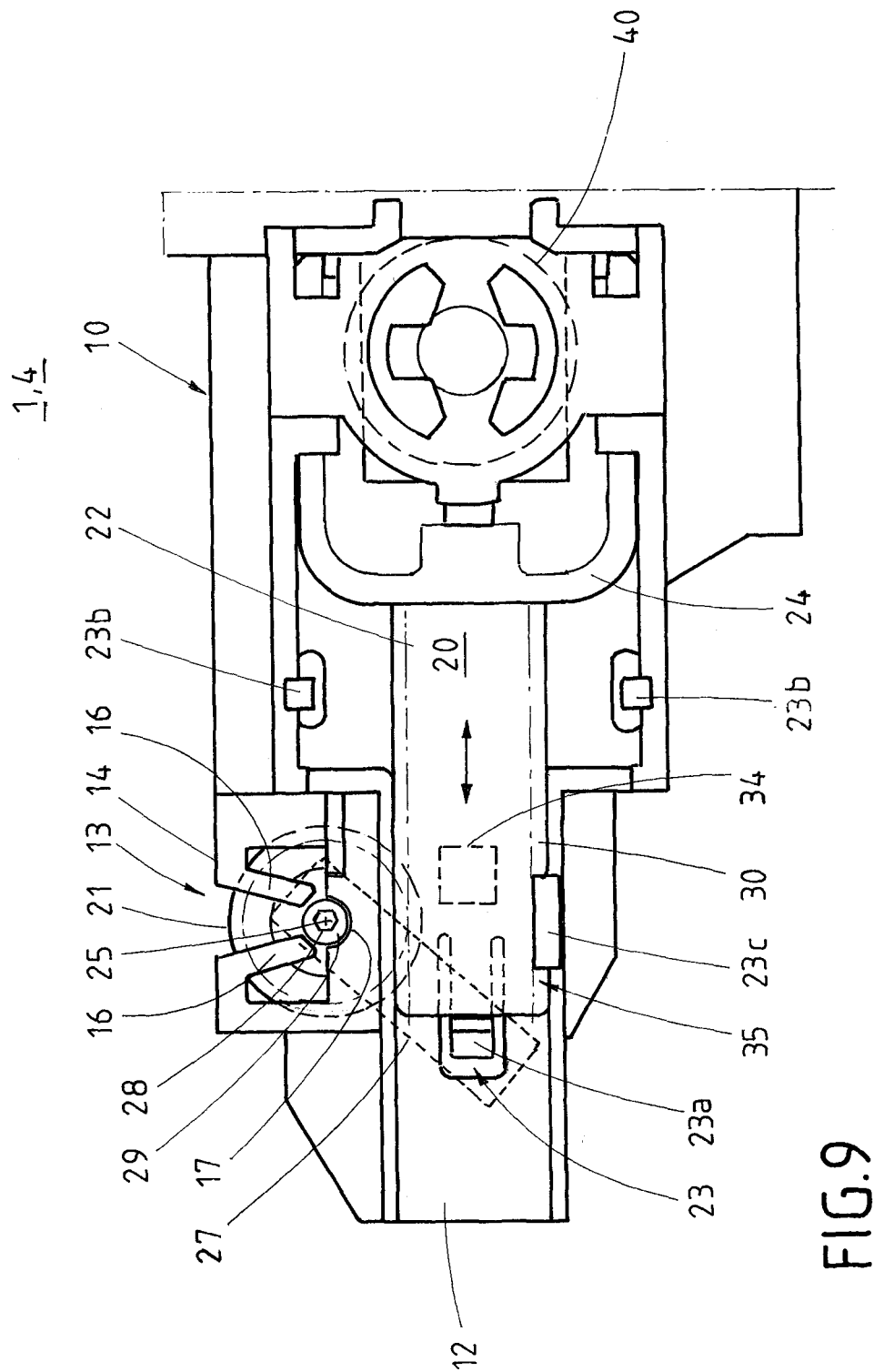
Figure 10:
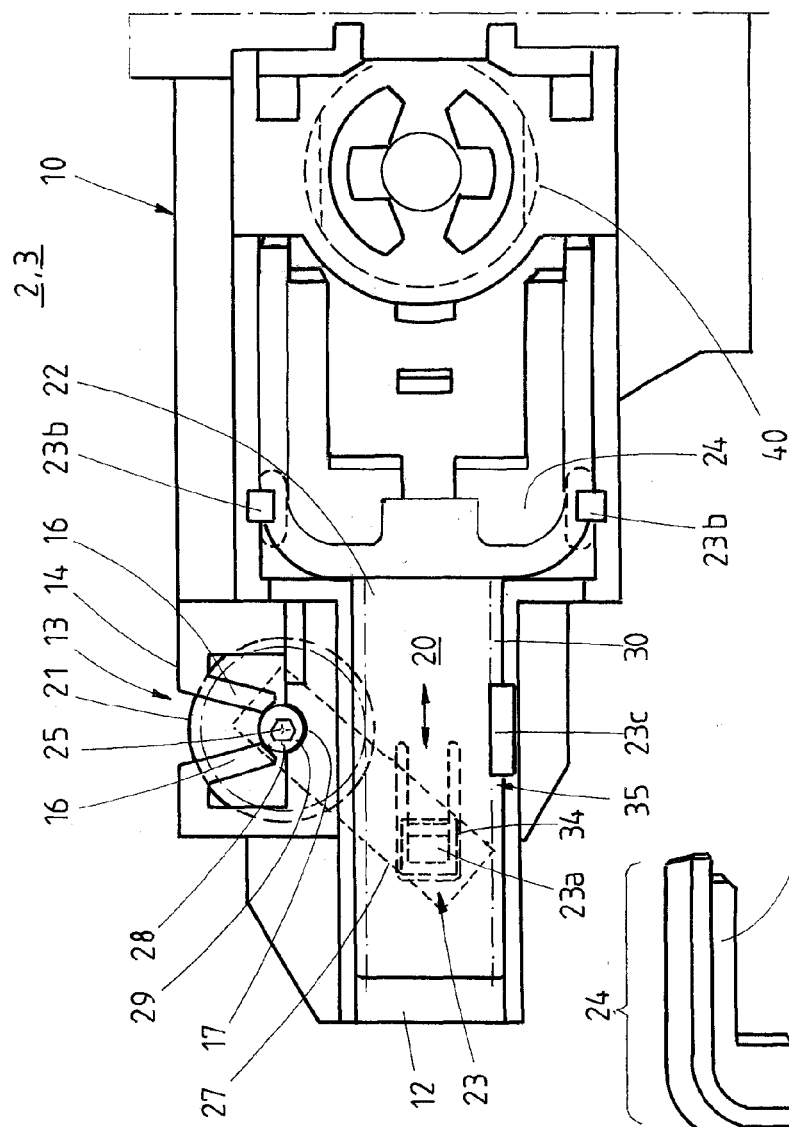
Figure 11:
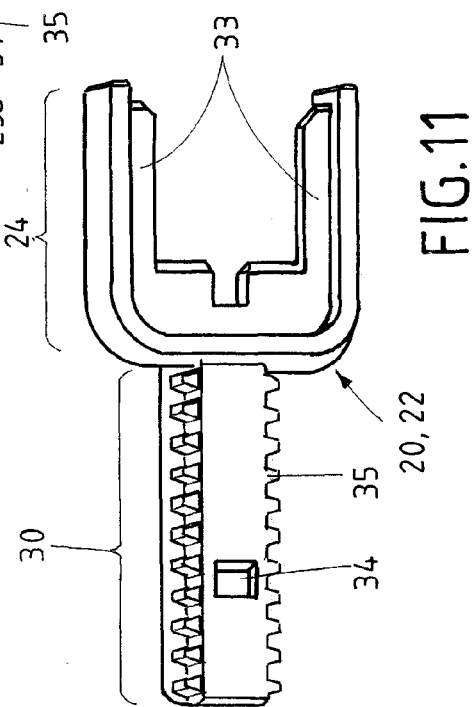
Figure 12:
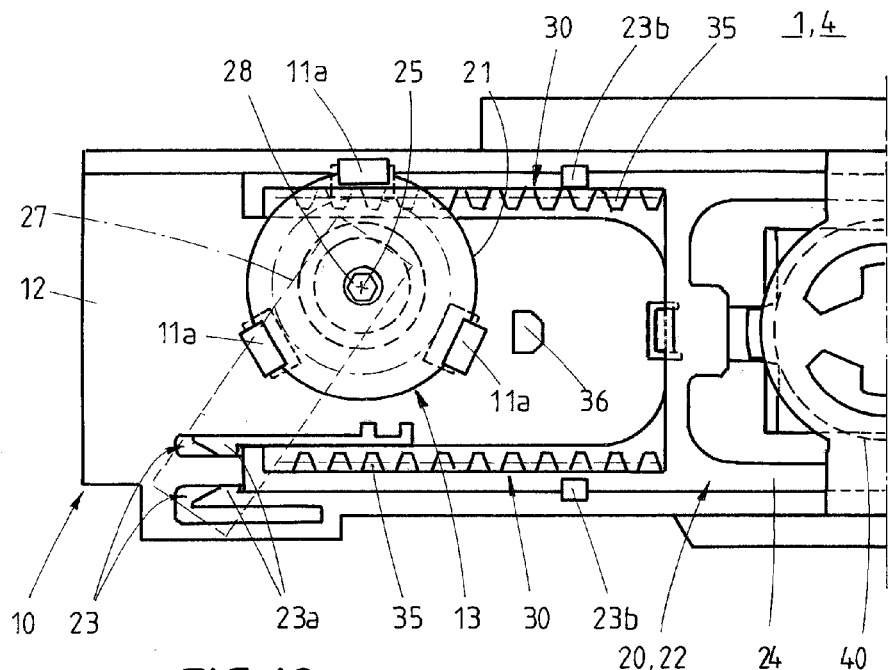
Figure 14:
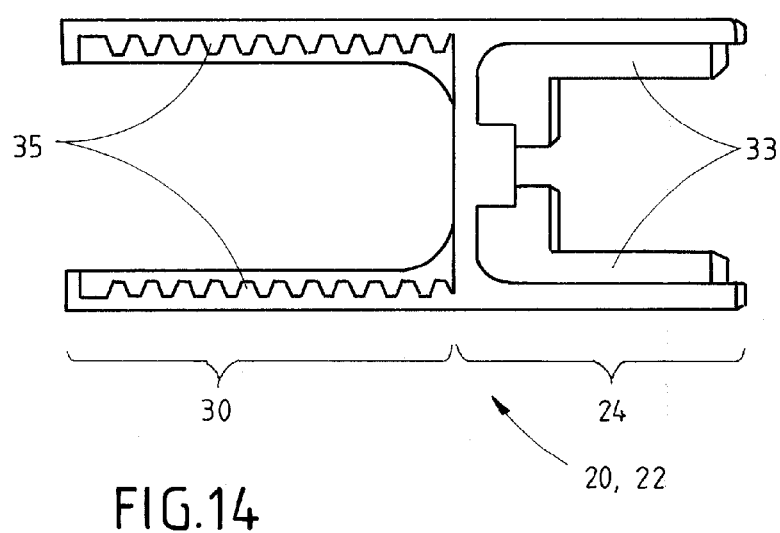
Figure 13:
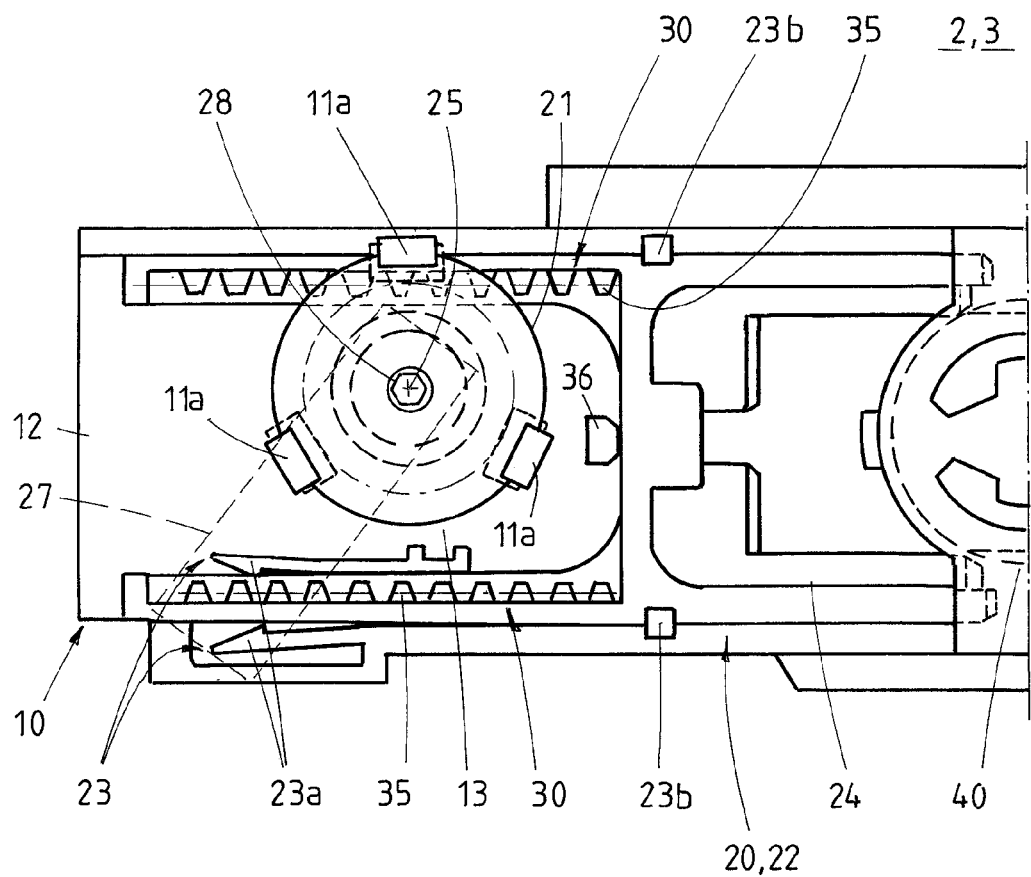

FIG. 1 shows a carrier of a handle according to the invention for a motor vehicle, FIG. 2 shows a enlarged view of the carrier with a blocking unit that is in its release position, FIG. 3 shows the device according to the invention according to FIG. 2 with the blocking unit in its blocking position, FIG. 4 shows a section view according to the section IV-IV in FIG. 3, FIG. 5 shows an additional detail view of the carrier according to FIG. 1, FIG. 6 shows a schematic view of the handle according to the invention on a motor vehicle, FIG. 7 shows a three-dimensional top view of a component of the blocking unit, specifically of the output element, FIG. 8 shows an additional three-dimensional view from below of the output element according to FIG. 7, FIG. 9 shows a view of an additional carrier with a blocking unit in a blocking position, FIG. 10 shows the view according to FIG. 9 with the blocking unit in its release position, FIG. 11 shows a schematic view of the blocking unit according to FIG. 9 and FIG. 10, FIG. 12 shows a view of an additional embodiment of a carrier with a blocking unit in its blocking position, FIG. 13 shows the view according to FIG. 12 with the blocking unit in its release position, and FIG. 14 shows a schematic view of the blocking unit according to FIG. 12 and FIG. 13.

FIG. 1 shows a carrier 10 of a handle of a motor vehicle. The carrier 10 is attached on the inside on a movable part 41 that is shown in FIG. 6. For example, the carrier 10 may be placed on a door 41. It is also possible to arrange the carrier 10 on a movable lid or tailgate of a motor vehicle that is not explicitly shown.

The handle is part of the locking system of a motor vehicle in order to open, close, lock, or unlock the movable part 41. The handle comprises an external grip element 11 that is shown in FIG. 6. This grip element 11 can be actuated by the user standing outside for opening the door 41 of the motor vehicle, for example. The grip element 11 may be supported movably on the carrier 10, with the grip element 11 in FIG. 1 being supported tiltably at the axis 5, for example. In addition, the carrier 10 comprises an opening 6 through which a component of the grip element 11 protrudes. By actuating the grip element 11, appropriate actions by the locking system of the motor vehicle can be triggered. In addition, the handle comprises an essential component 40 in accordance with the FIGS. 2 to 14 that must be attached appropriately on the carrier 10 during assembly. In this embodiment, the component 40 is a lock cylinder 40 that is to be operated by the user by means of a key. The lock cylinder 40 is located in a receptacle of the carrier 10. In order for the lock cylinder 40 to be fixed reliably during the installation of the handle on the motor vehicle door 41, a blocking unit 20 is provided that can be moved between a blocking position 1 and a release position 2. The blocking unit 20 comprises two gear elements 21, 22. The gear element 21 is accessible from the outside. The gear element 21 is a drive element 21 in the form of a drive wheel 21. The additional gear element 22 is a output element 22 that comprises a gear-rack-like section 30. The drive wheel 21 meshes with the gear-rack-like section 30.

FIG. 2 shows the blocking unit 20 in its release position 2, in which condition the lock cylinder 40 is located loosely in the carrier 30. In order to reliably attach the lock cylinder 40 on the carrier 10, it is possible by means of a tool to move the drive element 21 that moves around the axis of rotation 25. The counterclockwise movement of the drive wheel 21 simultaneously has the effect of moving the output element 22, shown in detail in FIGS. 7 and 8, in the direction of the lock cylinder 40.

FIG. 3 shows the blocking position 1 in which the output element 22, with reference to FIG. 2, has already moved in the direction of the lock cylinder 40 and reliably fixes this lock cylinder 40 appropriately on the carrier 10 without there being any danger that the lock cylinder 40 will become detached from the carrier 10.

In order to reliably hold the blocking position 1, a safety device 23 is provided. Like the blocking unit 20, the safety device 23 is accessible from the outside by means of a tool, for example. For this purpose the invention offers the assembly person an associated assembly window 27 that is shown in by way of example in FIG. 3, FIG. 9, and FIG. 12. The assembly window 27 as well as the individual elements of the blocking unit 20 and of the safety device 23 can be appropriately color coded to assist with the assembly.

In accordance with the embodiments shown in the Figures, the blocking unit 20 comprises a single-stage gear that is arranged in a space-saving way inside the carrier 10. For this purpose, the carrier 10 comprises a receptacle 13 in which the drive element 21 is held reliably by means of a latching connection. According to FIG. 2, FIG. 3, and FIG. 5, the receptacle 13 comprises a first opening 14 through which the drive element 21 can be inserted in the receptacle 13. In addition, the receptacle 13 comprises a second opening 15 through which the drive element 21 protrudes in the direction of the output element 22. In addition, the receptacle 13 comprises bars 16 with spring action that extend from the outside of the receptacle 13 in the direction of the axis of rotation 25 of the drive element 21. While the drive element 21 is being installed in the receptacle 13, the bars 16 with spring action deform elastically, and with the drive element 21 in inserted condition, according to the FIG. 2 and FIG. 3, the bars 16 move back to their original position. In addition, the carrier 10 comprises a support 17 that reliably accepts the drive element 21. The drive element 21 is designed with a centrally arranged hub 29 that is reliably supported in the support 17 as well as by the free ends of the bars 16.

In order to reliably install the drive element 21 in the receptacle 13, the receptacle 13 is designed, according to FIG. 5, with a first opening 14 that is slot-shaped in this embodiment. The second opening 15 is also slot-shaped, with the drive element 21 with its gearing protruding through it from the receptacle 13 and engaging the gear-rack-like section 30 of the output element 22.

As shown especially in the FIGS. 7 to 14, the output element 22 comprises an attachment area 24 which in the release position 2 (see FIG. 2) is detached from the lock cylinder 41. In the blocking position 1, shown in FIG. 3, FIG. 9, and FIG. 12, the attachment area 24 with its gear structure 33 engages the lock cylinder 40 (see FIG. 4 and FIG. 3), producing a reliable attachment of the lock cylinder 40 on the carrier 10.

According to FIG. 2 and FIG. 3, the safety device 23 comprises a safety element 26 on the gear-rack-like section 30 of the output element 22. When the output element 22 has reached its position according to FIG. 3, the final fixing of the output element 22 can be achieved by appropriately acting on the safety element 26 that may consist of a screw, for example. Here, the safety element 26 engages an opening 19 (see FIG. 5) of the carrier 10. There is no danger that the output element 22 with its attachment area 24 will then become detached from the lock cylinder 40.

The carrier 10 comprises guide surfaces 12 for the output element 22 that are shown in FIG. 1 to FIG. 3, in FIG. 5, and in FIG. 9 to FIG. 13.

In addition, in accordance with FIG. 1 to FIG. 5, the guide surface 12 comprises a guide element 18 which extends protrusion-like from the guide surface 12. This guide element 18 engages a groove-shaped counter-guide element 31 on the output element 22. This has the purpose of making a reliable linear movement of the output element 22 possible in order to move the blocking unit 20 between the blocking position 1 and the release position 2.

According to FIG. 6, the blocking unit 20 can be actuated with the safety device 23 from the inside 42 of the door 41 in order to effect an attachment of the lock cylinder 40 on the motor vehicle. According to FIG. 6, the carrier 10 is mounted, according to FIG. 2 and FIG. 3, in the door 41 vertically in relation to the ground surface on which the motor vehicle stands. As can be seen from FIG. 6, the external grip element 11 also extends vertically in relation to that ground surface.

In order to make it possible for the safety element 26 to reliably engage the opening 19 of the guide surface 12, the gear-rack-like section 30 is constructed with an associated opening 32. The attachment area 24 is C-shaped, with a tooth structure 33 provided in the interior area that, in the blocking position 1, engages associated grooves 43 of the lock cylinder 40, whereby a reliable fixing and attachment of the lock cylinder on the carrier 10 as well as on the handle of the motor vehicle is achieved.

Alternatively, the lock cylinder 40 may consist of a lock cylinder dummy that is also attached in accordance with the description provided above.

According to all embodiments shown in the Figures, the drive element 21 as well as the safety element 26 comprise a force-receiving contour 28 that can be engaged effectively from the outside by a tool in order to effect a movement of the output element 22 and/or to move the safety element 26 from a deactivated condition 3 to an activated condition 4, with the activated condition shown in FIG. 3, FIG. 9, and FIG. 12.

In the activated condition 4 according to FIG. 3, the safety element 26 is firmly bolted to the output element 22, so that the output element 22 is held immovably in its position and simultaneously fixes the lock cylinder 40 on the carrier 10.

FIG. 9 to FIG. 11 show an additional embodiment of a carrier 10 according to the invention of a handle of a motor vehicle. In FIG. 9, the blocking unit 20 is in the blocking position 1 in which it reliably fixes the component 40. As in FIG. 2 and FIG. 3, the drive element 21 is arranged in an associated receptacle 13. Its operation is already described in FIG. 2 and FIG. 3, so that we here refer to the above descriptions. The carrier 10 is equipped with a safety device 23 that is designed as a spring element. The carrier 10 as well as the safety device 23 form a monolithic component. In addition, the spring element 23 comprises a first latching element 23a that reliably holds the blocking unit 20 in the blocking position 1, according to FIG. 9. The first latching element 23a is engineered as a latching lug and engages at the left end of the gear-rack-like section 30 and prevents the blocking unit 20 from moving unintentionally from the blocking position 1 in the direction of the release position 2 that is shown in FIG. 10.

As FIG. 9 and FIG. 10 show, the carrier 10 comprises a second latching element 23b and a third latching element 23c, with the second latching element 23b and the third latching element 23c reliably holding, in the area of the guide surfaces 12, the blocking unit 20 in the blocking position 1 according to FIG. 9 as well as in the release position 2 according to FIG. 10. According to FIG. 9, the blocking unit 20 is held reliably in the guide surface 12 by the third latching element 23c, with the third latching element 23c engaging the gear-rack-like section 30. In the blocking position 1 of the blocking unit 20, the two opposed second latching elements 23b are free at a distance from the blocking unit 20. In FIG. 10, the two second latching elements 23b as well as the third latching element 23c engage the blocking unit 20 in a latching manner. Here, the third latching element 23c engages the gear-rack-like section 30 directly. The two second latching elements 23b, on the other hand, engage the attachment area 24 of the blocking unit 20.

According to FIG. 9 to FIG. 11, the blocking unit 20 comprises a receptacle 34. In this embodiment, the receptacle 34 is engineered as a recess. According to FIG. 10, the first latching element 23a engages the receptacle 34, with the spring element 23 being simultaneously not under tension. The assembly window 27 is shaped so that it is aligned diagonally or at an angle to the moving direction of the blocking unit 20. When the assembly person engages the drive element 21 according to FIG. 10 by means of a tool applied to the force-receiving contour 28 and performs a counterclockwise rotary movement, force is transferred to the gearing (not visible) that is arranged on the rear side of the gear-rack-like section 30 facing the guide surface 12. By means of a rotation of the drive element 21, a translational movement of the blocking unit 20 to the right is achieved, i.e. into the blocking position 1 that is reached in FIG. 9. While the blocking unit 20 is leaving the release position 2, the contour of the receptacle 34 pushes the latching element 23a of the spring element 23 with spring action into the plane of the drawing until the spring element 23 jumps back with spring action when the blocking unit 20 has reached the blocking position 1 according to FIG. 9. According to FIG. 9, the safety device 23 has reached the activated condition 4.

FIG. 11 clearly shows the gearing of the gear-rack-like section 30 while simultaneously showing the receptacle 34 that is engaged by the latching element 23a of the spring element 23 according to FIG. 10. The attachment area 24 has the same function as in the examples of embodiments described above, to which only reference is made below.

FIG. 12 to FIG. 14 show an additional example of an embodiment of a device for attaching the component 40. In FIG. 12, the blocking unit 20 is in the blocking position 1. In contrast to the examples of embodiments described above, the blocking unit 20 is designed differently in the area of the gear-rack-like section 30. The gear-rack-like section 30 here is configured in a C-shape, with the C-shaped area comprising two gears 35 that are located at a distance from each other, and with the drive element 21 supported rotatably between the gears 35 on the carrier 10. Here, the drive element 21 is operatively connected with only one of the two gears 35. According to FIG. 12 and FIG. 13, the lower gear 35 of the gear-rack-like section 30 meshes with the drive element 21. In addition, the carrier 10 comprises holding elements 11a that hold the drive element 21 securely between the gears 35. The holding elements 11a are engineered as latching hooks with spring action, with three latching hooks arranged at an angle of approximately 120° relative to each other being provided for the reliable fixing of the drive element 21.

In the blocking position 1, the safety device 23 engages the free end of the upper gear 35, thereby reliably preventing an unintentional shift of the blocking unit 20 from the blocking position 1 to the release position 2 according to FIG. 13. In addition, second latching elements 23b hold the blocking unit 20 in the area of the gear-rack-like section 30, so that the blocking unit 20 is held reliably on the guide surfaces 12 and is unable to fall approximately perpendicularly to the movement direction of the blocking unit 20 out of the carrier 10. According to the embodiment shown in FIG. 12 and FIG. 13, the safety device 23 comprises two spring elements 23 that are able to deform elastically upward and downward, respectively, when the blocking unit 20 is moved in the direction of the release position 2. In order to move the blocking unit 20 from the release position 2 according to FIG. 13 in the direction of the blocking position 1 according to FIG. 12, the assembly person applies a tool to the force-receiving contour 23 of the drive element 21 and is thereby able to effect, by means of a clockwise rotary motion, a linear movement of the blocking unit 20 to the left, i.e. in the direction of the blocking position 1. In the release position 2, the upper spring element 23 is located inside a receptacle (not shown) that is formed on the upper gear 35 and has the same function as the receptacle 34 according to FIG. 11. In the release position 2, the spring element 23 is not under tension and is not deformed elastically. If the blocking unit 20 is moved in the direction of the blocking position 1, the upper spring element is deformed elastically upwards, while the lower spring element 23 is simultaneously elastically deformed downwards. This makes it possible for the blocking unit 20 to shift translationally in the direction of the blocking position 1.

By means of suitable tools, the assembly person is able to move the blocking unit 20 from the blocking position 1 according to FIG. 9 and FIG. 12 back again to the release position 2. This requires a suitable tool to be guided through the assembly window 27 that is aligned at an angle to the movement direction of the blocking unit 20, with the first latching element 23a being elastically deformed at the same time, so that it no longer engages the gear-rack-like section 30. At the same time, the drive element 21 is rotated so that a transfer of the blocking unit 20 in the direction of the release position 2 can be achieved.

FIG. 14 shows an enlarged view of the blocking unit 20 that is used in FIG. 12 and FIG. 13. Its function corresponds essentially to the description with reference to FIG. 2 and FIG. 3. The gears 35 are aligned parallel to each other. It is an advantage that the blocking unit 20 can be used for the left as well as the right front door, and the axis of rotation of the drive element 21 can simultaneously be shifted to the upper gear 35. This makes it possible for the assembly person to use only one rotary direction for the left as well as the right door of the motor vehicle for setting the blocking unit 20 in the blocking position or in the release position. This means that in one door only the upper gear 35 is operatively connected with the drive element 21 while in the opposite door only the lower gear 35 is operatively connected with the drive element 21. This has a positive effect on the ease of assembly.

According to FIG. 12, a stop 36 is arranged on the carrier 10 that prevents the blocking unit 20 from hitting or contacting the drive element 21 when the blocking unit 20 is moved in the direction of the release position 2.

LIST OF REFERENCE NUMBERS

1 blocking position
2 release position
3 deactivated condition
4 activated condition
5 axis
6 opening
10 carrier
11 grip element
11a holding element
12 guide surfaces
13 receptacle
14 first opening
15 second opening
16 bar
17 support
18 guide element
19 opening for safety device 26
20 blocking unit
21 gear element, drive element, drive wheel
22 gear element, output element
23 safety device, spring element
23a first latching element
23b second latching element
23c third latching element
24 attachment area
25 axis of rotation
26 safety element
27 assembly window
28 force-receiving contour
29 hub
30 gear-rack-like section
31 counter-guide element
32 opening for 26
33 tooth structure
34 receptacle
35 gear
36 stop
40 component
41 movable part, door
42 inside of 41
43 groove

The invention claimed is:

1. Device for attaching an essential component, of a handle of a motor vehicle, with a carrier which can be attached on the inside on a movable part, specifically a lid, a tailgate, or a door, wherein a blocking unit is arranged on the carrier that comprises movable gear elements with which the blocking unit can be moved between a blocking position and a release position, with the component being located loosely on the carrier in the release position, and the component being held reliably on the carrier in the blocking position;

wherein the arrangement of the gear elements is a single-stage gear with a drive element and an output element, specifically with the drive element being engineered as a drive wheel and/or the output element being engineered gear-rack-like at least in part;

wherein the carrier is engineered with a receptacle for the drive element, with the drive element held on the receptacle by means of a latching connection and/or the drive element being supported with spring action in the receptacle;

wherein the receptacle comprises bars with spring action that extend from outside the receptacle in the direction of an axis of rotation of the drive element.

2. Device according to claim 1, wherein at least one gear element is accessible from the outside in order to effect an attachment of the component, specifically with access to at least one gear element provided from the inside of the movable part.

3. Device according to claim 1, wherein an outside grip element may be arranged on the carrier and/or that an outside grip element is supported movably on the carrier, with the grip element and the carrier extending in elongated configuration that extends horizontally or vertically on the movable part, with the movable part consisting specifically of a hinged door or tailgate or a sliding door.

4. Device according to claim 1, wherein the blocking unit comprises a safety device that secures the retention of the blocking position in activated condition, specifically with the safety device being accessible from outside, and/or with the access to the safety device provided from the inside of the movable part.

5. Device according to claim 1, wherein the blocking unit comprises a movable attachment area that is detached from the component in the release position and reliably engages the component in the blocking position, with specifically the output element being engineered with the attachment area.

6. Device according to claim 5, wherein the attachment area is C-shaped, with the attachment area embracing at least in sections the component in the blocking position.

7. Device according to claim 1, wherein the carrier is engineered with defined guide surfaces that make a movement of the attachment area and/or the output element possible.

8. Device according to claim 1, wherein the receptacle comprises a first opening through which the drive element can be placed in the receptacle and/or a second opening through which the drive element protrudes in the direction of the output element.

9. Device according to claim 1, wherein the first and/or the second opening are slot-shaped.

10. Device according to claim 1, wherein on the gear-rack-like section of the output element that is operatively connected with the drive element, a safety device is provided, with, specifically in the blocking position, a safety element extending through the gear-rack-like section of the output element and simultaneously intruding into the guide surface.

11. Device according to claim 7, wherein the guide surface comprises a guide element that engages a counter-guide element of the output element.

12. Device according to claim 1, wherein the drive element and the output element mesh, specifically with the gearing being of a self-locking type.

13. Device according to claim 1, wherein an assembly window is provided that only allows manipulation by means of a tool on the drive element as well as on the safety device.

14. Device according to claim 1, wherein the safety device and/or the drive element comprise a force-receiving contour so that a tool can act on the safety device and/or on the drive element.

15. Device according to claim 1, wherein the safety device is engineered as a spring element that forms a monolithic component with the carrier and/or is connected with the carrier in a materially uniform way, with the spring element being formed with a first latching element that reliably holds the blocking unit in the blocking position, with specifically the first latching element holding the gear-rack-like section of the output element in the blocking position of the blocking unit.

16. Device according to claim 7, wherein the carrier comprises a second and/or a third latching element, with the second and/or the third latching element reliably holding, in an area of the guide surfaces, the blocking unit in the blocking position and/or in the release position.

17. Device according to claim 15, wherein the blocking unit comprises a receptacle that is engaged by the first latching element in the release position of the blocking unit, specifically with the spring element not under tension.

18. Device according to claim 17, wherein the first latching element secures the blocking unit against a shift in the direction of the release position, and/or that a second and/or a third latching element secure the blocking unit from unintentionally falling out perpendicularly to a movement direction between the blocking position and the release position.

19. Device according to claim 18, wherein an assembly window is aligned perpendicularly and/or diagonally to a movement direction of the blocking unit between the blocking position and the release position.

20. Device according to claim 1, wherein the gear-rack-like section may be bar-shaped or C-shaped, with the C-shaped section comprising two gear racks arranged at a distance from each other, and with the drive element supported rotatably between the gears on the carrier.

21. Device according to claim 20, wherein the drive element is operatively connected with only one of the two gear racks.

22. Device according to claim 21, wherein the carrier comprises holding elements that hold the drive element securely between the two gear racks, with specifically the holding elements being engineered as latching hooks with spring action.

23. Device for attaching an essential component, of a handle of a motor vehicle, with a carrier which can be attached on the inside on a movable part, specifically a lid, a tailgate, or a door, wherein a blocking unit is arranged on the carrier that comprises movable gear elements with which the blocking unit can be moved between a blocking position and a release position, with the component being located loosely on the carrier in the release position, and the component being held reliably on the carrier in the blocking position;

wherein the arrangement of the gear elements is a single-stage gear with a drive element and an output element, specifically with the drive element being engineered as a drive wheel and/or the output element being engineered gear-rack-like at least in part;

wherein the carrier is engineered with a receptacle for the drive element, with the drive element held on the receptacle by means of a latching connection and/or the drive element being supported with spring action in the receptacle;

wherein on the gear-rack-like section of the output element that is operatively connected with the drive element, a safety device is provided, with, specifically in the blocking position, a safety element extending through the gear-rack-like section of the output element and simultaneously intruding into the guide surface.

24. Device for attaching an essential component, of a handle of a motor vehicle, with a carrier which can be attached on the inside on a movable part, specifically a lid, a tailgate, or a door, wherein a blocking unit is arranged on the carrier that comprises movable gear elements with which the blocking unit can be moved between a blocking position and a release position, with the component being located loosely on the carrier in the release position, and the component being held reliably on the carrier in the blocking position;

wherein the arrangement of the gear elements is a single-stage gear with a drive element and an output element, specifically with the drive element being engineered as a drive wheel and/or the output element being engineered gear-rack-like at least in part;

wherein the carrier is engineered with a receptacle for the drive element, with the drive element held on the receptacle by means of a latching connection and/or the drive element being supported with spring action in the receptacle;

wherein the gear-rack-like section may be bar-shaped or C-shaped, with the C-shaped section comprising two gear racks arranged at a distance from each other, and with the drive element supported rotatably between the gears on the carrier;

wherein the drive element is operatively connected with only one of the two gear racks;

wherein the carrier comprises holding elements that hold the drive element securely between the two gear racks, with specifically the holding elements being engineered as latching hooks with spring action.

* * * * *